UNITED STATES PATENT OFFICE.

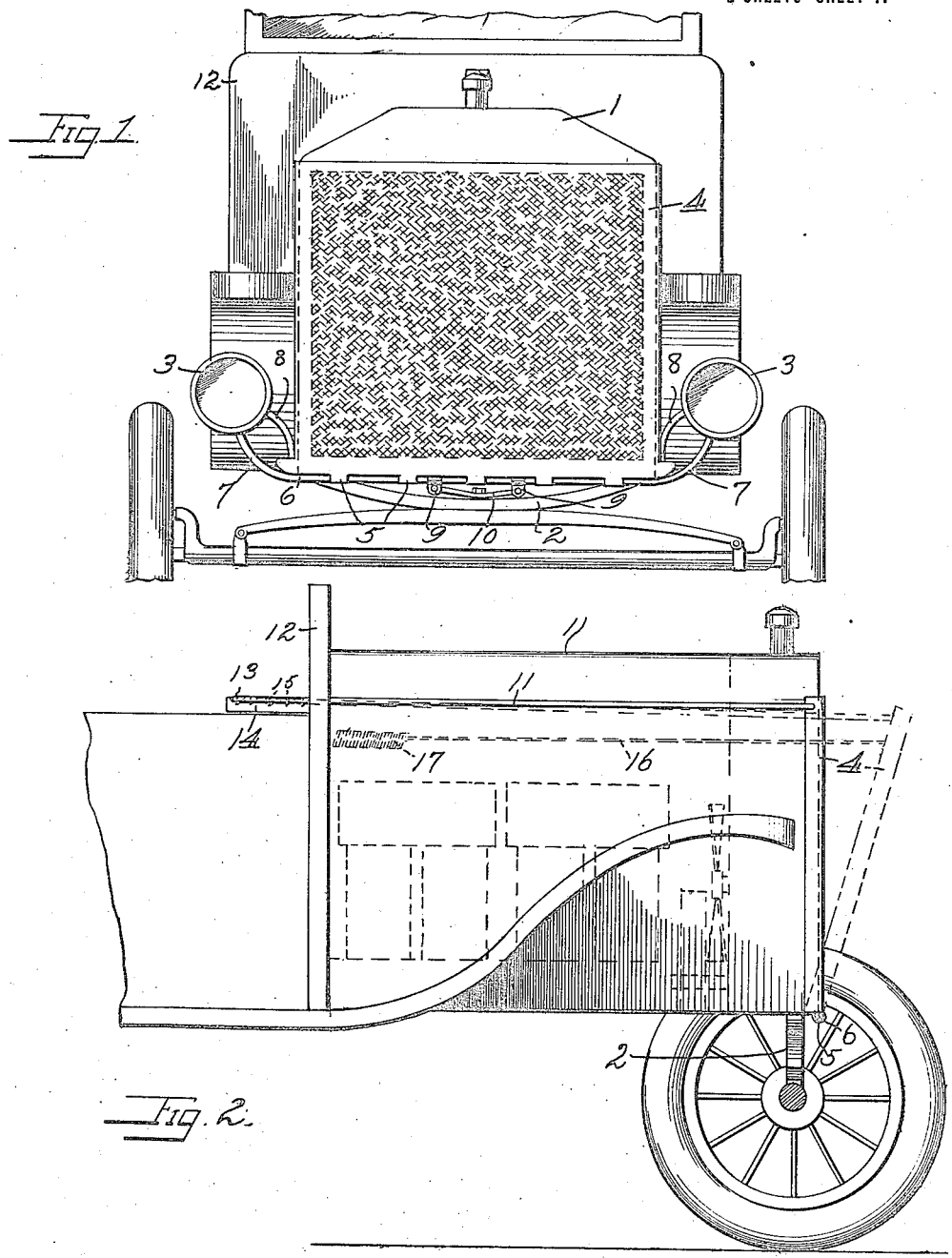

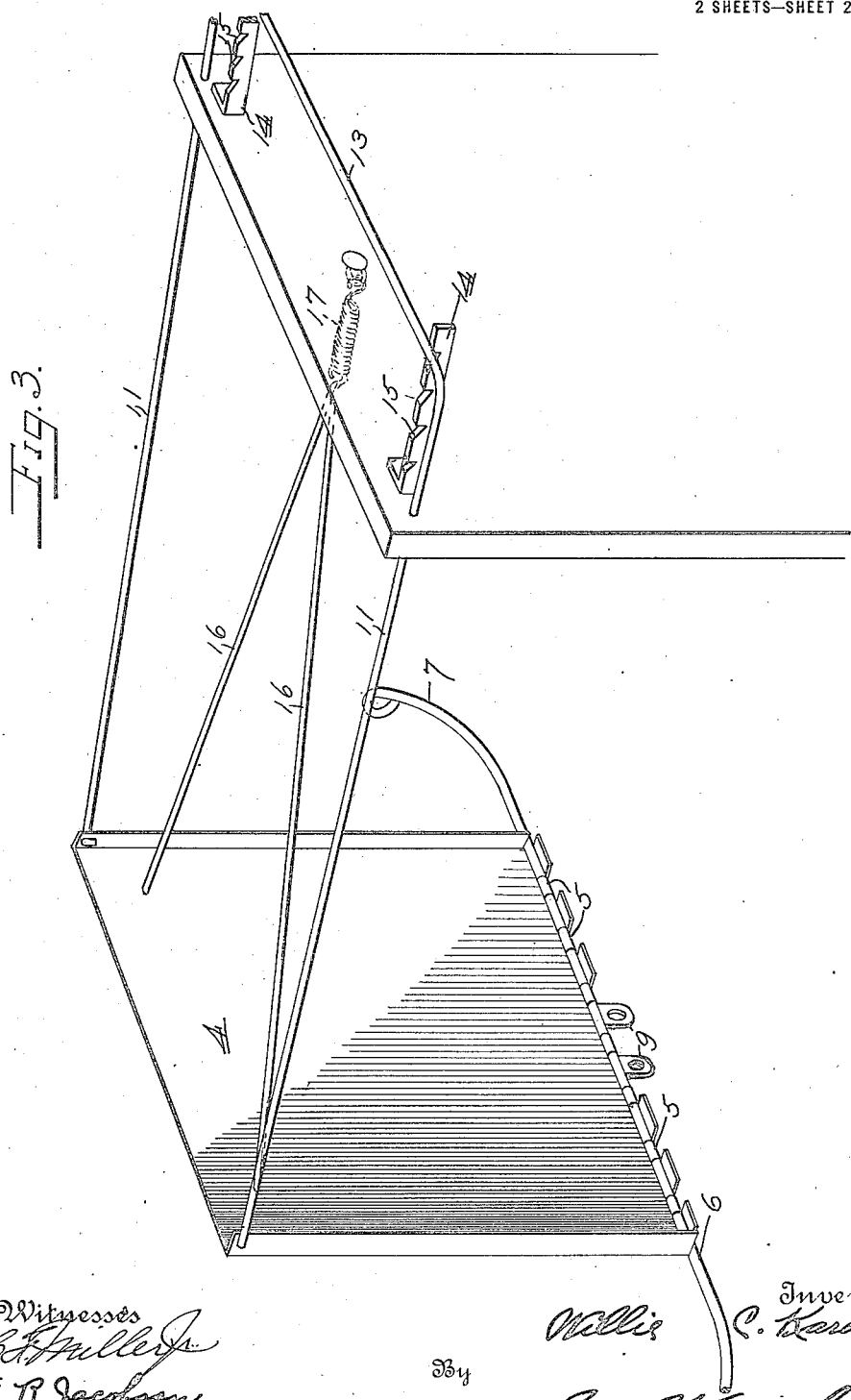

WILLIE C. KAROW, OF GERMANTOWN TOWNSHIP, COTTONWOOD COUNTY, MINNESOTA.

RADIATOR-SHIELD FOR AUTOMOBILES.

1,167,571.               Specification of Letters Patent.      Patented Jan. 11, 1916.

Application filed March 9, 1915. Serial No. 13,109.

*To all whom it may concern:*

Be it known that I, WILLIE C. KAROW, a citizen of the United States, residing in Germantown township, county of Cottonwood, and State of Minnesota, have invented certain new and useful Improvements in Radiator-Shields for Automobiles, of which the following is a specification.

This invention relates to improvements in radiator shields for automobiles.

The object of my invention is to provide a radiator shield for the front of an automobile that may be opened or closed from the driver's seat in the car to let in or keep out the air from the radiator. In very cold weather there is danger of the water in the radiator pipes freezing and bursting the pipes and my shield is designed to close the front of the hood of the automobile so tightly that the freezing of the water will be prevented. Furthermore, the opening of my shield may be regulated from the car without the necessity for getting out of the car to adjust the same. The shield may be opened various degrees and held in the desired position by means of a graduated locking member for the push-bar which operates the shield.

Other objects of this invention not at this time more particularly enumerated, will be clearly understood from the detailed description and drawings forming a part of this specification.

Furthermore, this invention consists in the novel arrangement and combination of parts more particularly described in the following specification and embodied in the claims appended hereunto and forming a part of this application.

Referring now to the drawings, which are merely illustrative of my invention, Figure 1 is a front elevation of my shield on the front of the hood of an automobile showing the radiator in dotted lines. Fig. 2 is a side elevation of the front of an automobile with my shield attached, showing the same closed, in full lines, and open, in dotted lines. Fig. 3 is a perspective view of my device.

Referring further to the drawings, wherein similar reference characters designate similar parts throughout the respective views, 1 designates generally the hood of an automobile, 2 the springs, and 3 the lamps thereof. A metallic or wood shield 4 of a size substantially coextensive with the front of the hood 1 is hingedly mounted at 5 to a supporting rod 6 extending across the bottom of said shield and having outwardly and upwardly curved arms 7 adapted to be secured to the lamp brackets 8. For greater stability in the mounting of said shield I secure two lugs 9 at certain points near the center of said rod 6, a fastening element 10 being secured to said lugs 9 and to the springs 2. A push-bar 11 having its central portion bent at right angles to the ends thereof is secured at its ends to the shield 4 near the top and at the outer portion thereof, said bar being adapted to extend rearwardly along the outside of the hood 1, through the dashboard 12 and terminating with the rectangular central portion or handle 13 on the inside of the dashboard 12. Two oppositely disposed locking members 14 provided with engaging teeth 15 are mounted upon the inside of the dashboard 12, said teeth being adapted to engage with the handle 13 so as to hold the same in any predetermined position. A plurality of wires 16 are secured at one of their ends to the inner face of said shield 4, and extend rearwardly through the radiator of the automobile, the opposite ends of said wires being secured to one end of a tension spring 17, the opposite end of said spring being secured at 18 to the dashboard 12. The said wires 16 and springs 17 are normally of a length and tension adapted to maintain said shield in closed position.

From the foregoing description, it is obvious that when it is desired to open the shield, the handle 13 is pushed forwardly to the point desired and that it is then locked in that position by engagement with the teeth 15 of the locking members 14. Also, all that is necessary to close the shield is to release the handle from its locked position and the spring actuated wires 16 will return the shield to the closed position.

The utility, adaptability, and advantages of my improved form of radiator shield for automobiles being obvious, it is unnecessary to further enlarge upon the same herein.

Having now described and pointed out the new and useful features of my invention, I do not limit myself to the shape of certain parts where the shape is not essential, nor do I restrict myself to the exact details of construction shown and described, but mean and intend to claim all equivalents and variations thereof not departing in principle from my invention and falling within the purview of the appended claims.

What I claim as my invention and desire to secure by Letters Patent is:

1. In a radiator shield for automobiles, the combination of an imperforate plate member coextensive with the front of the hood of an automobile, said plate member being hingedly mounted upon the front of an automobile, a push-bar secured to said plate member and extending therefrom to a point within the car, said push-bar being adapted to move one end of said plate outwardly from the front of the automobile, means adapted to coöperate with said push-bar to maintain the same in a predetermined position, and means secured to said plate member adapted to return the same to closed position when said push-bar is disengaged from said last-named means.

2. In a radiator shield for automobiles, in combination, an imperforate plate member coextensive with the front of the hood of an automobile, a hinge secured to the bottom of said plate member, said hinge mounted upon the front of said automobile, a push-bar secured at its end near the top of said plate member and extending rearwardly along the outside of the hood of said automobile, a handle formed on the other end of said push-bar, a graduated locking member mounted upon the dashboard of said automobile, said locking member adapted to coöperate with said handle, and a spring actuated wire secured to said plate member and said dashboard adapted normally to maintain said plate member in closed position.

In testimony whereof I affix my signature in the presence of two persons.

WILLIE C. KAROW.

Witnesses:
A. H. DERR,
JULIUS KAROW.